United States Patent [19]

Hammel et al.

[11] Patent Number: 5,134,171
[45] Date of Patent: Jul. 28, 1992

[54] DEGRADABLE FOAM MATERIALS

[75] Inventors: Howard S. Hammel, Bear; Robert O. York, Wilmington, both of Del.

[73] Assignee: E. I. Du Pont de Nemours and Company, Wilmington, Del.

[21] Appl. No.: 826,357

[22] Filed: Jan. 27, 1992

Related U.S. Application Data

[63] Continuation of Ser. No. 552,657, Jul. 16, 1990, abandoned.

[51] Int. Cl.$^5$ ................................. C08J 9/14
[52] U.S. Cl. .................... 521/98; 521/131; 521/182; 521/189; 521/916
[58] Field of Search ............ 521/98, 131, 182, 189, 521/916

[56] References Cited

U.S. PATENT DOCUMENTS

| | | | |
|---|---|---|---|
| 4,422,877 | 12/1983 | Spitzer et al. | 106/122 |
| 4,719,246 | 1/1988 | Murdoch et al. | 521/134 |
| 4,766,182 | 8/1988 | Murdoch et al. | 525/413 |
| 4,988,740 | 1/1991 | Walter et al. | 521/138 |

Primary Examiner—Morton Foelak
Attorney, Agent, or Firm—Charles E. Krukiel

[57] ABSTRACT

Closed cell rigid polyhydroxy acid resin compositions foamed with environmentally benign, which compositions are degradable and cause minimal environmental impact when discarded.

14 Claims, No Drawings

DEGRADABLE FOAM MATERIALS

RELATED PATENT APPLICATION

This application is a continuation of patent application Ser. No. 07/552,657 filed Jul. 16, 1990, now abandoned.

BACKGROUND OF THE INVENTION

1. Field of the Invention

This invention relates to polyhydroxy acid foam materials, particularly for food service and food packaging applications. The materials of this invention are degradable, both biodegradable and hydrolyzable. Furthermore, they are foamed with environmentally benign gas and so contain no stratosphere ozone-depleting chemicals nor chemicals that have significant low altitude smog forming photochemical ozone producing reactivity. They have little global warming potential compared to chlorofluorocarbon (CFC) blowing agents. Thus, this invention provides readily degradable foam packaging materials with minimal environmental impact.

2. Description of the Related Art

At the present time, the most commonly used food service and food packaging materials are light weight closed cell foamed polystyrene, usually foamed with chlorofluorocarbon (CFC) or hydrocarbon (HC) blowing agents. These products pose serious environmental problems.

First, polystyrene is not degradable, either in landfills or as roadside litter. Thus, unless collected and recycled, polystyrene foam products have an unlimited and litter life.

Second, CFC blowing agents trapped in the foam products, which make up a high volume percentage of the products, eventually escape to the stratosphere where the chlorine enters an ozone-depletion cycle.

Third, if HC blowing agents are used in place of CFCs, upon release from the foam they are photochemically reactive and thus promote smog formation. Also, they are flammable.

Thus, there is a need for light weight closed cell foam of a degradable resin foamed by a blowing agent that does not enter into chemical reactions that cause environmental damage.

Degradable polylactides are shown in Murdoch U.S. Pat. Nos. 4,766,182 (Aug. 23, 1988) and 4,719,246 (Jan. 12, 1988). These patents also disclose forming open cell porous structures by the extraction of solvent from polylactide gel. These open cell structures cannot be used for containers for wet foods such as meats and drinks. Also, to the extent any of Murdoch's blowing agents are present in the porous product, they are not environmentally benign.

Battelle WO 90/01521 published Feb. 22, 1990 discloses degradable PHA resins, and their processing into solid films. The films may be made into "foam" structures by dissolving therein a mixture of petroleum ether and methylene chloride, and then placing the film into boiling water to volatilize the liquid mixture. The Battelle "foam" films are irregular and unsuitable. Also, upon degradation these products will release a high volume percent of hydrocarbons that are deleterious to the atmosphere.

A number of blowing agents, including fluorohydrocarbons, are known in the art. Spitzer U.S. Pat. No. 4,422,877 (Feb. 4, 1982) shows the use of a number of blowing agents, including 1,1-difluoroethane, to form foams from a number of resins. However, no PHA foam articles are disclosed.

Walter U.S. Pat. No. 4,988,740 (Jan. 29, 1991, filed Jun. 15, 1989) discloses closed cell elastic foam material made from elastomeric polymer. No rigid PHA foam products are disclosed.

"The Elements of Expansion of Thermoplastics", Part I and Part II, James G. Burt, Journal of CELLULAR PLASTICS, May/June 1979 (Part I) and Nov./Dec. 1978 (Part II) disclose in detail the mechanics of melt-foaming thermoplastic resins. This article, while not disclosing PHA foams, sets forth a large number of requirements that must be met by the foaming ingredients to prepare an acceptable foam product, such as: amount of plasterization of the molten resin by the blowing agent; volatility of the blowing agent at foaming temperature; speed of solidification of the blown resin on cooling; heat transfer necessary for solidification; molecular migration of the blowing agent through the blown cell walls; melt viscosity and melt strength of the resin during the cooling/solidification; the rate of change of polymer viscosity with temperature; and a number of other properties. One concludes that the suitability of particular polymeric resins to be foamed can be determined only by trial and error.

HFC manufacture is known in the art. See "Aliphatic Fluorine Compounds", A. M. Lovelace et al. (1958), p. 55.

The above patents and literature references are incorporated herein in total and made a part of this patent application.

SUMMARY OF THE INVENTION

It has been found that certain PHAs form excellent degradable environmentally benign light weight rigid closed cell foam structures when foamed by inert environmentally benign blowing agents. The products of the present invention are foam products, particularly packaging and food container products, comprising one or more specific thermoplastic PHAs, the closed cells of which foam product enclose one or more fluorocarbon blowing agent.

DESCRIPTION OF THE INVENTION

The foam products of the present invention comprise foam closed cell degradable thermoplastic polymeric resins containing at least 50% by moles of lactic acid, and/or glycolic acid units, the remainder comonomer units being selected from the group consisting of:

(1) $(OCR^1R^2)_nCO)_p$
(2) $(OCR^1R^2COOCR^1R^2CO)_q$
(3) $(OCR^1R^2CR^1R^2OCR^1R^2CO)_r$
(4) $(OCR^1R^2CR^1R^2OCR^1R^2CR^1R^2CO)_s$ wherein n is a whole number 2, 4 and 5, the total of p, q, r and s being 50 to about 5,000 and $R^1$ or $R^2$, which can be the same of different, are hydrogen, hydrocarbyl containing 1 to 12 carbon atoms, or substituted hydrocarbyl containing 1 to 12 carbon atoms; and the closed foam cells contain some inert blowing agent.

The preferred foams of this invention comprise degradable polymeric resins selected from the group consisting of polylactic acid (PLA), polyglycolic acid (PGA), copolymers of lactic acid and glycolic acid (PLA/PGA), block or random copolymers of lactic and/or glycolic acid, block or random copolymers containing at least 50% by moles of lactic and/or glycolic acid, the remainder being selected from units of formulae (1) to (4). Especially preferred units are -caprolactone, -valerolactone, lactide(3,6-dimethyl-1,4-dioxan-2,5-dione), glycolide(1,4-dioxan-2,5-dione), 1,5-dioxepan-2-one, 1,4-dioxan-2-one, -butyrolactone and -propiolactone. Preferable polymeric resins are those containing at least 50% of lactic and/or glycolic acid units. More preferred are those containing at least 80% of lactic and/or glycolic acid units. Even more preferred are those containing at least 95% of lactic and/or glycolic acid units, and those containing only lactic and/or glycolic acid units. Preferred is polylactic acid itself.

These polymers have the combination of properties required for good foaming, particularly adequate melt strength over a wide enough temperature range and low diffusion rate to contain the blowing agent. They have low enough crystallinity and rate of crystal formation to allow an adequate temperature range of foamable melt viscosity of adequate strength to maintain cell integrity.

The resultant foamed products comprising resin and fluorocarbon are excellent low density rigid products, that although non-elastomeric, can be hot molded to shapes such as plates and cups that have good heat insulating properties. The densities are not over 20 pounds per cubic foot (pcf) and preferably under 10 pcf.

The polymer is converted to foam by nitrogen, carbon dioxide or a blowing agent of the formula:

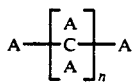
(5)

wherein all A's are independently hydrogen or fluorine, and n=1-4. The nitrogen, carbon dioxide and HFC of formula (5) are chemically compatible with and useable with conventional foam blowing equipment, and are thermally stable and chemically non-reactive during the blowing and subsequent thermaforming stages. A significant amount of blowing agent remains in the closed cells of the foam product for an extended period of time. Of course, air does defuse into the individual cells.

The cells of these products are closed cells in a significant proportion even after hot molding, usually above 90% of the cells being closed before shaping and 50% after shaping. In its simplest concept, the present invention is the use of nitrogen, carbon dioxide or HFCs of the formula (5) as a foam blowing agent for specific resins to produce highly useful, environmentally superior foam products.

The preferred products of the present invention are a degradable resin foamed by and containing in closed cells an environmentally benign hydrofluorocarbon (HFC) blowing agent.

By "foam" is meant a low density microcellular structure consisting essentially of thin contiguous cell walls of 0.0003 to about 0.030 inches thickness each side of which forms a wall of one or more closed cells containing blowing agent. The cells have a maximum cell size of 0.03 inches.

The foams of the invention are rigid, in contrast to elastomeric. By "rigidity" is meant that when compressed, the films of the invention will be crushed and cell structure destroyed. They will not recover back to their pre-compression shape upon release of compression. Thus, the present products have no significant elastic recovery and cannot be compressed without cell destruction.

While some cell walls may be broken, the majority of cells of the present invention product are unbroken, giving the foam rigidity and structural strength. After being made, foam may be shaped by molding, calendering, or cutting. The foams of the present invention, being essentially non-elastic, retain their shape when thermo molded.

The polymers may be synthesized by polymerization directly from the acid precursors, or by the polymerization of the cyclic monomeric or dimeric (depending on the acid type) lactone. Polymerization from the cyclic lactone is preferred for producing high molecular weight polymers because equilibrium reactions with the intermediate, cyclic dimer and low molecular weight species place practical limits on the molecular weight of polymers produced directly from the acid.

The polymers of this invention have molecular weights from about 50,000 to about 600,000; and preferably from about 100,000 to about 450,000. High molecular weight is required to provide sufficient melt viscosity and strength to enable the polymer to form a sustainable foam. If the molecular weight is too high, excessive degradation occurs at the temperatures required to melt process the compositions.

The polymer compositions will normally contain some unreacted monomers and low molecular weight oligomers, such as lactyllatate and lactile units. To avoid extrusion and foaming problems, it is desirable to keep the low molecular weight, under 450, units in the polymer composition to less than about 7½%.

Also, preferred polymer compositions are those having a major component of 50–97%, and most preferably from about 85 to 96 mol % of the L enantiomer of lactic acid corresponding to unit(2) above, where $R_1$ is the methyl group, $R_2$ is the hydrogen atom. The minor component of these preferred compositions can be any of the other units (1) to (4) above, with the proviso that if additional lactic acid units are utilized, they be of the D enantiomeric configuration.

The term "degradable" as used here with respect to the polylactate polymers means that the polylactate portion of the degradable material is biodegradable and, more importantly, degradable by hydrolysis. The degradation rate is consistent with its intended usage, i.e., the product does not significantly degrade in normal storage and usage, but will degrade significantly in a reasonable time after discarding. As is known in the art, hydrolysis degradation is dependent on the degree of crystallinity of the polymer; the higher crystallinity polymers degrade more slowly. For hydrolysis degradation, slightly acidic or basic conditions may be used advantageously. By hydrolysis degradation, monomer units can be recovered if desired for reconversion to useful polylactate polymers or can be discarded as an environmentally benign waste material.

Acceptable blowing agents must have the following properties:
environmental acceptability
low toxicity
appropriate volatility
adequate solubility
low reactivity
acceptable diffusion rate
relatively low molecular weight.

Environmental acceptability means that the blowing agent, when released from the foam product, will have no potential for stratospheric ozone depletion. In this regard, blowing agents containing chlorine atoms are unacceptable. Also, when released, the blowing agent must have a minimal infrared energy absorbability and appropriate atmospheric lifetime so that it will not have significant global warming potential, and also have negligible photochemical reactivity so as not to promote smog formation. Hydrocarbon blowing agents are unacceptable because they promote the formation of low level ozone.

Low toxicity of the blowing agent is required to protect employees during foam manufacture. Also, it must not be toxic to used of the foam products, which is of particular importance in food service and food packaging applications.

The blowing agent must also have appropriate volatility for use with the thermoplastic resins of the present invention. Such blowing agents must provide the solution pressure required to expand and foam the viscous polymeric resin.

The blowing agent must have adequate solubility in the molten polymer, which means that the blowing agent is readily contained in the molten polymer when present in the concentration required for the needed degree of foaming. If the blowing agent separates from the polymeric resin before expansion of the blowing agent, gas pockets or non-uniform foam density can be caused.

The blowing agent must have low reactivity, which means that it will not react with the resin or decompose under the typical temperatures and pressures conventionally used in thermoplastic resin foam production. Similarly, the blowing agent must be nonreactive under normal use so as to prevent product degradation.

An acceptable diffusion rate is necessary for the blowing agents in the foams of the present invention. A very slow diffusion rate is preferred so that the thermoforming of foamed sheet into shaped objects such as hamburger containers, plates, etc. is easily achieved.

A relatively low molecular weight blowing agent is desirable. Molecular weight determines the pounds of blowing agent needed to produce a given volume of gas. Thus, use of a low molecular weight blowing agent minimizes the blowing agent cost per unit of production.

It has been found that HFC blowing agents selected from those represented by formula (5) are ideally suited, with respect to the aforementioned properties, when used to make foam products with the polymeric resins of the units for formulae (1)–(4). Suitable HFC blowing agents of formula (5) used with a specific polymeric resin of the units of formulae (1)–(4) can be readily determined by conventional techniques.

The following HFCs are suitable blowing agents for the foams of the present invention:

| HFC-32 | $CH_2F_2$ |
| HFC-125 | $CF_3CF_2H$ |
| HFC-134 | $HCF_2CF_2F$ |
| HFC-134a | $CF_3CFH_2$ |
| HFC-143a | $CF_3CH_3$ |
| HFC-152 | $CH_2F-CH_2F$ |
| HFC-152a | $CH_3-CHF_2$ |
| HFC-227 EA | $CF_3CHF-CF_3$ |
| HFC-356 MFF | $CF_3-CH_2-CH_2-CF_3$ |
| HCC-365 MFC | $CF_3-CH_2-CF_2-CH_3$ |

The preferred HFCs are those containing one and two carbon atoms.

The foam products of the present invention have a unique combination of properties making them environmentally acceptable both with respect to the atmosphere and also for disposal. Concerning disposal, they can be landfilled whereupon they will biodegrade and/or hydrolyze to harmless degradation products, or they can be recycled by hydrolysis depolymerization, preferably under slightly acidic or basic conditions, to form monomeric units that can be used in the production of polymer.

The foam products of the present invention can be made by conventional techniques. Thus, the polymeric resin with the blowing agent therein can be pressure extruded at an appropriate temperature below the degradation or reaction temperature of the resin and the blowing agent. These extruded products can be hot formed into desired shapes. The foamed product can be in the form of a sheet or a shaped article such as hamburger containers, trays, plates, boxes and the like. These products are particularly useful in food packaging and food service containers because of the combined properties of low toxicity and environmental acceptability.

In addition to polymer and blowing agent, conventional adjuvants can be included. Typical adjuvants are nucleants such as calcium silicate talc; processing aids such as mineral oils; extrusion aids such as dioctylphthalate (DOP); and color concentrates. The concentrations of the additives are generally independent of the amount of blowing agent.

EXAMPLE 1

Continuous production at the rate of 500 lbs./hr. of a foam sheet product is prepared by feeding to a 4½"–6" tandem extrusion system with annular die and mandrel a mixture of 2½ lbs. per hour of calcium silicate talk nucleating agent and 472.5 lbs./hr. of molten polylactic acid (85% L, the remaining 15% being D/L and a small amount of low molecular weight lactide and oligomer, the polymer having a molecular weight of about 300,000). Into the molten polymer in the extruder is introduced 25 lbs. per hr. of $CF_3-CFH_2$ (HFC-134a). The temperature of the material in the 4½" extruder is maintained at 400° F., and the pressure at 2500 lbs./sq. in. gauge. Prior to exiting the 6" extruder the temperature is dropped low enough to prevent cell collapse upon discharge from the extruder. The HFC comes out of solution in the polymer forming an oriented cell wall degradable thermoplastic closed cell foam product. This product is a rigid foam sheet 44 inches wide and 100 mils thick, having a density of 6 lbs. per cubic foot, with the individual cells containing HFC-132a.

The sheet foam is then heated, softened and stamped into 12" circular plates using a thermoformer. The plates are closed cell foams containing blowing agent.

Following the same procedures, sheets ranging from 50–100 mils thick are prepared and thermoformed into hinged food service containers.

EXAMPLES 2-8

Following the procedure of Example 1, there are formed plates and service containers of PHA/HFC closed cell foams from the ingredients listed below:

| Ex. | Blowing Agent | M.W. | #/hr. | PLA Compositions* | #/hr. | Calcium Silicate Talc Nucleator |
| --- | --- | --- | --- | --- | --- | --- |
| 2 | $CH_2F_2$ (HFC-32) | 52 | 2.55 | 85% L | 494.95 | 2.5 |
| 3 | $CH_3CHF_2$ (HFC-152a) | 66 | 3.24 | 70% L | 494.26 | 2.5 |
| 4 | $CF_3-CH_2F$ (HFC-134a) | 102 | 5 | 60% L | 492.5 | 2.5 |
| 5 | $CF_3CHFCF_3$ (HFC-227 EA) | 170 | 8.33 | 75% L | 489.17 | 2.5 |
| 6 | $CF_3CH_2CF_2CH_3$ (HFC-365 MFC) | 166 | 8.14 | 50% L | 489.36 | 2.5 |
| 7 | $N_2$ | 28 | 1.37 | 85% L | 496.13 | 2.5 |
| 8 | $CO_2$ | 44 | 2.16 | 85% L | 495.34 | 2.5 |

*The remaining PLA composition is D polylactic acid isomer plus less than 7% low molecular weight lactide and oligomer.

EXAMPLES 9-13

Following the procedure of Example 3, preferred polymers are foamed into rigid closed cell sheets which are thermoformed into plates. The polymers are PGA, and various lactic/glycolic unit and ratio copolymers.

| Ex. | Polymer |
| --- | --- |
| 9 | 100% PGA |
| 10 | 30% LA/70% GA Copolymer |
| 11 | 60% LA/40% GA Copolymer |
| 12 | 90% LA/10% GA |
| 13 | 100% LA/GA Copolymer |

We claim:

1. A rigid resin foam composition degradable by hydrolysis of less than 20 pounds per cubic foot density, having a significant percentage of closed cells which contain inert environmentally benign blowing agent, which composition is moldable into useful shapes and comprises degradable polyhydroxy acid resin containing at least 50% by moles resin, the amounts of which are selected from the group consisting of lactic acid and glycolic acid units, the remainder comprising comonomer units selected from the group consisting of;

(1) $(OCR^1R^2)_n(CO)_p$
(2) $(OCR^1R^2COOCR^1R^2CO)_q$
(3) $(OCR^1R^2CR^1R^2OCR^1R^2CO)_r$
(4) $(OCR^1R^2CR^1R^2OCR^1R^2CR^1R^2CO)_s$ wherein n is a whole number 2, 4 & 5; the total of p, q, r and s being 50 to about 5,000; and $R^1$ and $R^2$, which can be the same or different, are selected from the group consisting of hydrogen, hydrocarbyl containing 1 to 12 carbon atoms, and substituted hydrocarbyl containing 1 to 12 carbon atoms.

2. A composition of claim 1 wherein $R^1$ and $R^2$ are independently selected from the group consisting of hydrogen and methyl.

3. A composition of claim 1 wherein the degradable polyhydroxy acid resin contains at least 80% by moles of lactic acid and/or glycolic acid units.

4. A composition of claim 1 wherein the degradable polyhydroxy acid resin contains at least 95% by moles of units selected from the group consisting of lactic acid and glycolic acid units.

5. A composition of claim 1 wherein the degradable polyhydroxy acid resin units are selected from the group consisting of lactic acid and glycolic acid units.

6. A composition of claim 1 wherein the degradable polyhydroxy acid resin consists of only lactic acid units.

7. A composition of claim 1 wherein the degradable polyhydroxy acid resin consists of only glycolic acid units.

8. A composition of claim 1 wherein over 50% of the polylactate resin is L-isotropic form polymer units.

9. A composition of claim 1 wherein the polymer resin contains less than 7½% lactide and lactyllactate oligomer units of less than 450 molecular weight.

10. A composition of claim 1 wherein the blowing agent is selected from the group consisting of nitrogen, carbon dioxide and compounds represented by the formula:

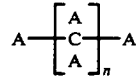

wherein all A's are independently hydrogen or fluorine, and n=1-4.

11. A composition of claim 1 wherein n=1.
12. A composition of claim 1 wherein n=2.
13. A composition of claim 1 capable of being formed into containers for hot and cold liquids.
14. A composition of claim 1 comprising a food container.

* * * * *